(12) United States Patent
Yonetani et al.

(10) Patent No.: US 10,160,320 B2
(45) Date of Patent: Dec. 25, 2018

(54) HEAD-UP DISPLAY AND VEHICLE

(71) Applicant: Panasonic Intellectual Property Management Co., Ltd., Osaka (JP)

(72) Inventors: Yusuke Yonetani, Hyogo (JP); Satoshi Kuzuhara, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 114 days.

(21) Appl. No.: 15/191,488

(22) Filed: Jun. 23, 2016

(65) Prior Publication Data

US 2016/0303974 A1    Oct. 20, 2016

Related U.S. Application Data

(63) Continuation of application No. PCT/JP2015/002898, filed on Jun. 10, 2015.

(30) Foreign Application Priority Data

Sep. 8, 2014  (JP) ................................ 2014-181940

(51) Int. Cl.
*G02B 27/14* (2006.01)
*G03H 1/00* (2006.01)
(Continued)

(52) U.S. Cl.
CPC .......... *B60K 35/00* (2013.01); *G02B 17/0621* (2013.01); *G02B 27/0101* (2013.01);
(Continued)

(58) Field of Classification Search
CPC ............ G02B 27/0172; G02B 27/0101; G02B 2027/0178; G02B 2027/0132; G02B 2027/011; G02B 27/01
USPC ........ 359/630–634, 409–410, 462, 638–639, 359/13–14, 603–636, 404, 407; 348/115; 345/7, 9, 156; 349/11; 701/1; 310/49 R,
(Continued)

(56) References Cited

U.S. PATENT DOCUMENTS 5,272,563 A    12/1993  Evans et al.
5,734,357 A     3/1998  Matsumoto
(Continued)

FOREIGN PATENT DOCUMENTS

JP    2-142324 U    12/1990
JP    4-249213       9/1992
(Continued)

OTHER PUBLICATIONS

International Search Report of PCT application No. PCT/JP2015/002898 dated Aug. 18, 2015.

*Primary Examiner* — Dawayne A Pinkney
(74) *Attorney, Agent, or Firm* — Wenderoth, Lind & Ponack, L.L.P.

(57) ABSTRACT

A head-up display includes a display device that displays an image toward a vertically downward direction, a first mirror that reflects the image to output reflected light toward a vertically upward direction, and a second mirror that reflects the reflected light from the first mirror to output reflected light toward a vertically upward direction. A vehicle includes the head-up display, and a windshield that reflects the reflected light emitted from the head-up display.

15 Claims, 10 Drawing Sheets

(51) Int. Cl.
  *G09G 5/00* (2006.01)
  *H04N 7/00* (2011.01)
  *G02F 1/1335* (2006.01)
  *G05D 1/00* (2006.01)
  *B60Q 1/00* (2006.01)
  *B60K 35/00* (2006.01)
  *G02B 17/06* (2006.01)
  *G02B 27/01* (2006.01)

(52) U.S. Cl.
  CPC .... *G02B 27/0149* (2013.01); *G02B 2027/011* (2013.01); *G02B 2027/015* (2013.01)

(58) Field of Classification Search
  USPC ......... 310/156.32–156.35, 266–268, 156.02; 340/438, 980, 995.1, 815.47, 815.74
  See application file for complete search history.

(56) References Cited

U.S. PATENT DOCUMENTS

| | | |
|---|---|---|
| 6,262,848 B1 | 7/2001 | Anderson et al. |
| 2008/0192358 A1 | 8/2008 | Watanabe et al. |
| 2008/0218870 A1 | 9/2008 | Lind et al. |
| 2009/0034087 A1* | 2/2009 | Hung ................... G02B 5/0284 359/630 |
| 2011/0175798 A1* | 7/2011 | Sato ....................... B60K 35/00 345/7 |
| 2011/0317273 A1 | 12/2011 | Kasai et al. |
| 2014/0285899 A1* | 9/2014 | Kilcher ................. G02B 13/22 359/631 |

FOREIGN PATENT DOCUMENTS

| | | |
|---|---|---|
| JP | 4-283134 | 10/1992 |
| JP | 7-290993 | 11/1995 |
| JP | 8-156646 | 6/1996 |
| JP | 2002-542991 | 12/2002 |
| JP | 2005-082103 | 3/2005 |
| JP | 2008-527433 | 7/2008 |
| JP | 2008-195194 | 8/2008 |
| JP | 2009-222881 | 10/2009 |
| JP | 2010-164941 | 7/2010 |
| JP | 2010-208580 | 9/2010 |
| WO | 2000/067064 | 11/2000 |
| WO | 2011/077688 | 6/2011 |
| WO | 2014/087085 | 6/2014 |

* cited by examiner

HEAD-UP DISPLAY AND VEHICLE

BACKGROUND

1. Technical Field

The present disclosure relates to a head-up display that displays an image as a virtual image appearing in front of a front glass of a vehicle such as an automobile or the like.

2. Description of the Related Art

Such a head-up display is known that reflects an image by a front glass of a vehicle such as an automobile, to display a virtual image. The head-up display uses a plane mirror and a concave mirror to magnify an image displayed on a display panel and to project the magnified image on a display area of a front glass of an automobile so that the magnified image is reflected by the front glass to provide a virtual image which can be visually recognized by a driver of the automobile. A head-up display having such a configuration is disclosed that includes a light source device for generating light to irradiate a display panel from the backside, an illumination device which obtains external light through a lighting window to irradiate the display panel from the backside with the external light, and a changeover mirror which is disposed so that its position is changeable between a position to block the light from the illumination device and a position to reflect the light from the illumination device toward the display panel (see, for example, Unexamined Japanese Patent Publication No. 2009-222881).

SUMMARY

An object of the present disclosure is to provide a thin head-up display.

A head-up display in accordance with the present disclosure includes a display device that displays an image toward a downward direction, a first mirror that reflects the image to output reflected light toward an upward direction, and a second mirror that reflects the reflected light from the first mirror to output reflected light toward an upward direction.

According to the present disclosure, it is possible to provide a thin head-up display.

DETAILED DESCRIPTION

Hereinafter, an exemplary embodiment will be described with reference to the accompanying drawings as appropriate. However, unnecessarily detailed description may occasionally be omitted. For example, detailed description of well-known matters and redundant description of substantially the same configuration may occasionally be omitted. This is to avoid the following description from becoming unnecessarily redundant, and to allow any person skilled in the art to easily understand the description.

Also, it should be noted that the following description and the accompanying drawings are provided to allow any person skilled in the art to fully understand the present disclosure, and that it is not intended to limit the subject matter described in the claims by the following description.

First Exemplary Embodiment

1. Configuration 1-1. Configuration of Head-Up Display

Figure 1:
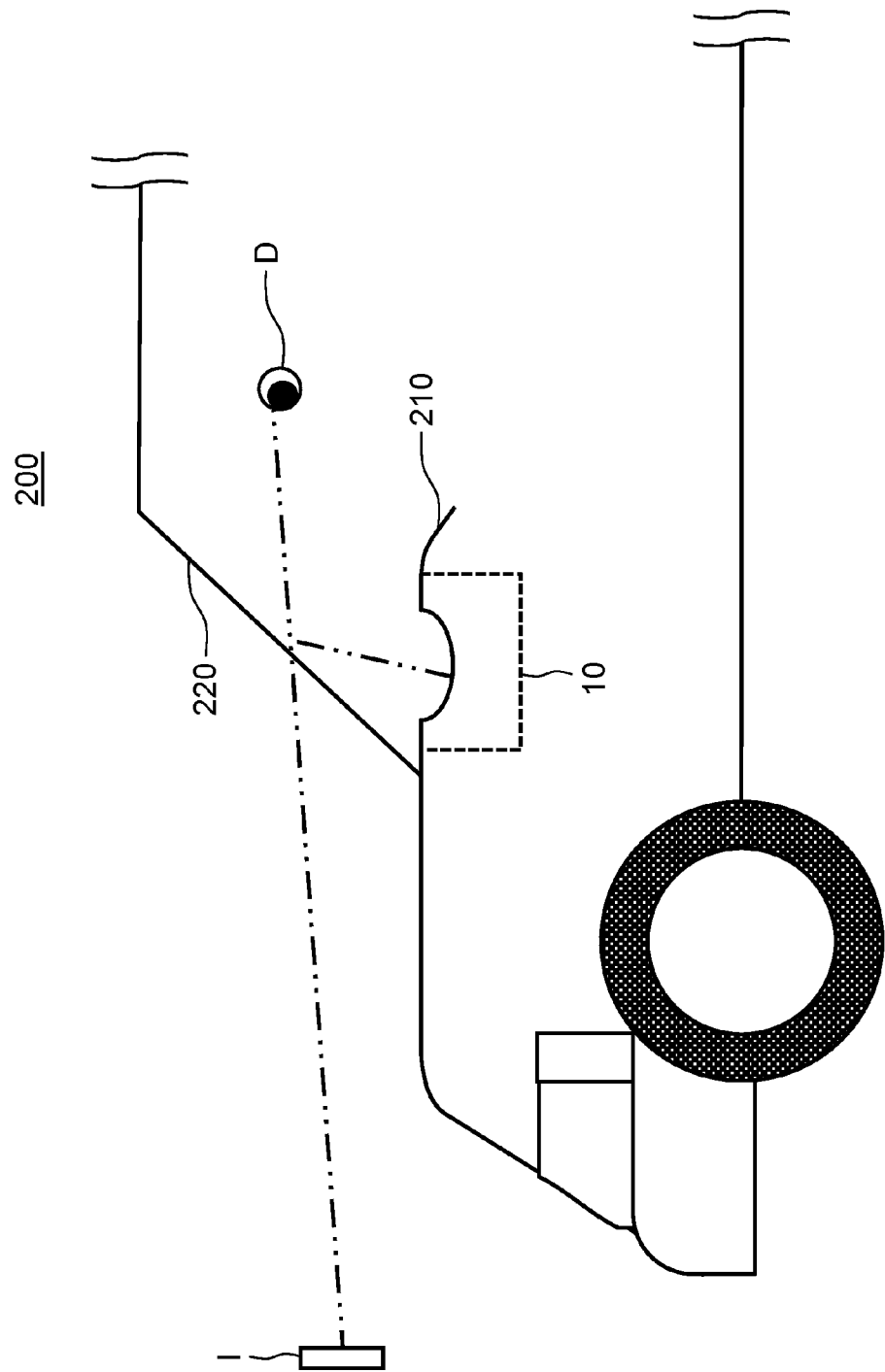
FIG. 1 is a schematic diagram illustrating a cross-section of a vehicle equipped with a head-up display in accordance with an exemplary embodiment.

FIG. 1 is a schematic diagram illustrating a cross-section of a vehicle equipped with a head-up display in accordance with an exemplary embodiment.

As shown in FIG. 1, head-up display 10 is disposed inside dashboard 210 of automobile 200, which is a vehicle. An image output from head-up display 10 is reflected by windshield 220 to be guided to observer D so that virtual image I can be visually recognized by observer D.

Figure 2:
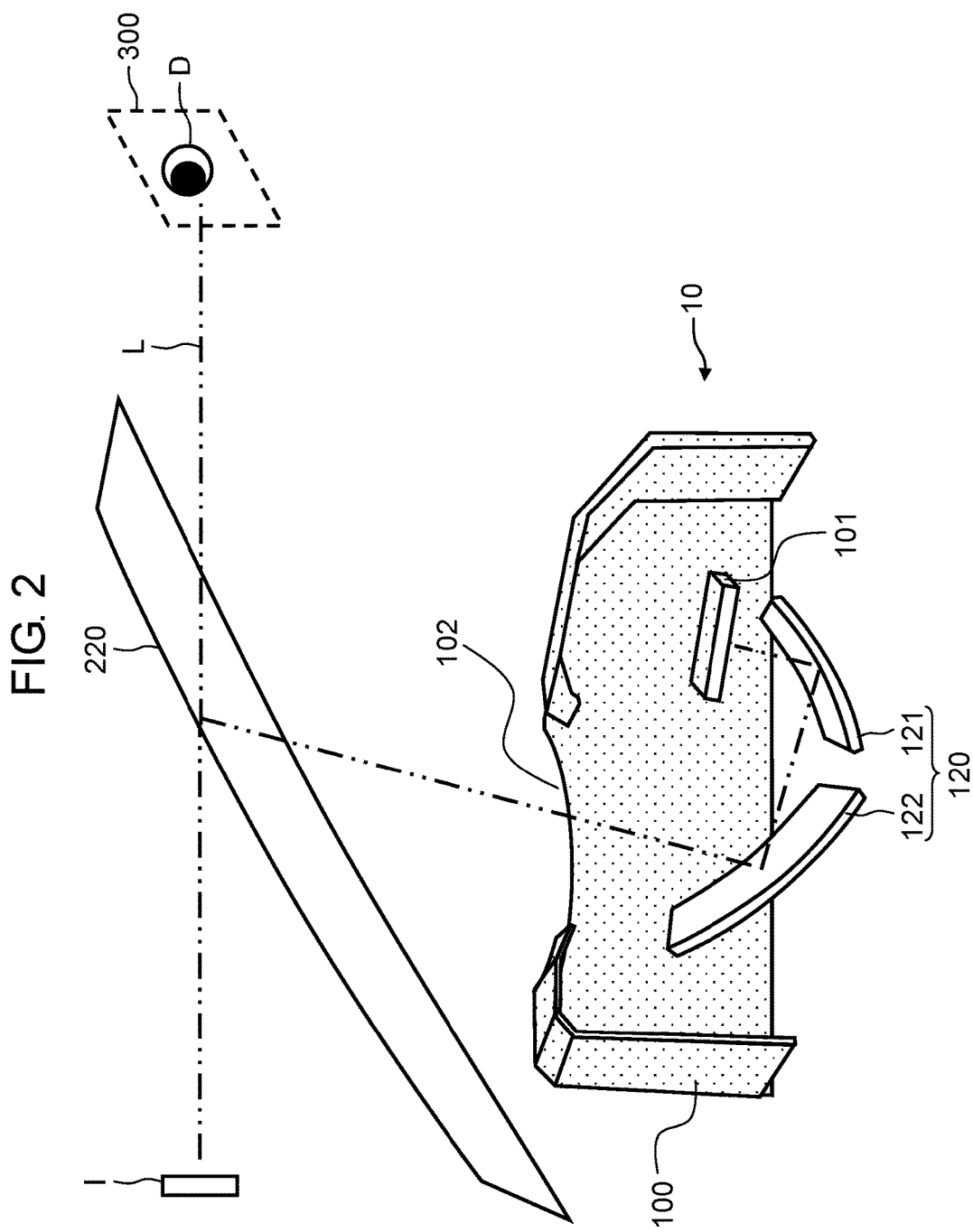
FIG. 2 is a schematic diagram illustrating a cross-section of the head-up display in accordance with the exemplary embodiment.

FIG. 2 is a schematic diagram illustrating a cross-section of head-up display 10 in accordance with the exemplary embodiment. As shown in FIG. 2, head-up display 10 includes chassis 100, projection optical system 120, and display device 101.

Chassis 100 has aperture 102 on its upper part. Aperture 102 may be covered by a transparent cover. Further, the transparent cover may have a lens shape to adjust the magnification of virtual image I. Also, dashboard 210 may assume the role of chassis 100.

Display device 101 displays an image. A microcomputer (not shown) controls the image to be displayed on display device 101. The displayed image may include, for example, a driving route suggestion, a distance to a vehicle in front, a remaining vehicle battery charge, and a current vehicle speed. Devices that can be used as display device 101 include, for example, a liquid crystal display (LCD), an organic light emitting device (OLED) (also called an organic electroluminescence display), and a plasma display panel (PDP).

Projection optical system 120 is configured by first mirror 121 and second mirror 122. An image displayed on display device 101 is first reflected by first mirror 121, then reflected by second mirror 122, and further reflected by windshield 220 to reach eyebox 300 of observer D and to be visually recognized by observer D as virtual image I. Here, eyebox 300 is defined as an area in which observer D can view the entire virtual image I without any missing part.

Here, first mirror 121 may have a shape which is rotational asymmetry or may have a curved surface shape which has a difference in the sign of curvature between an X-direction and a Y-direction.

Also, the shape of first mirror 121 may be a trapezoid or may be changed appropriately depending on the size of chassis 100.

1-2. Arrangement of Projection Optical System and Display Device

Figure 3:
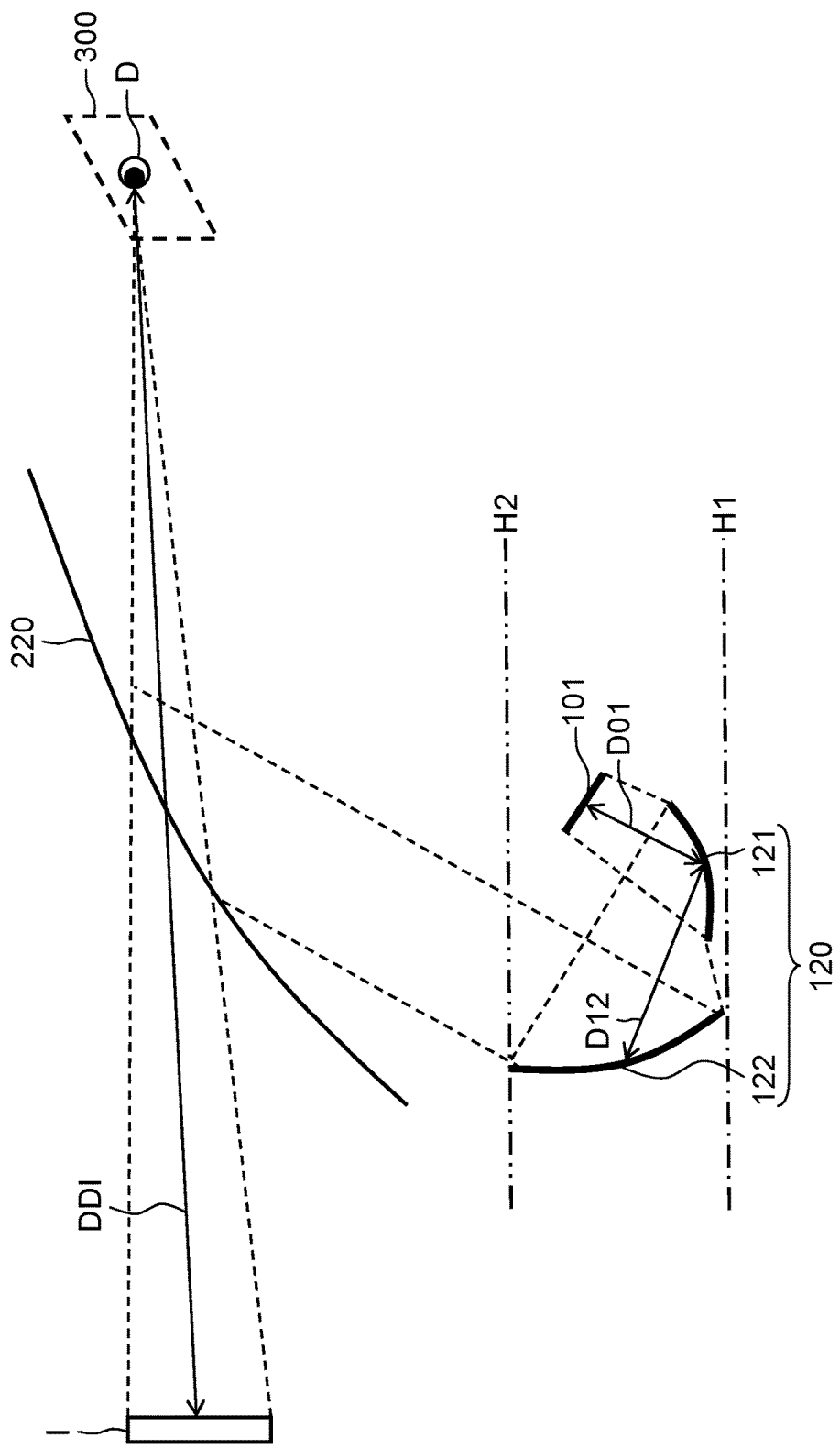
FIG. 3 is a diagram explaining an arrangement of a projection optical system and a display device of the head-up display in accordance with the exemplary embodiment.

FIG. 3 is a diagram explaining an arrangement of projection optical system 120 and display device 101 of head-up display 10 in accordance with the exemplary embodiment.

Referring to FIG. 3, the vertical position of display device 101 is closer to windshield 220 than the position of first mirror 121, or upper than the position of first mirror 121. A display surface of display device 101 faces first mirror 121. In other words, a vector of light emitted from display device 101 and incident on first mirror 121 has a component that is directed toward a vertically downward direction. A reflection surface of first mirror 121 is eccentrically disposed so as to guide an image displayed on display device 101 toward a reflection surface of second mirror 122. At this time, a vector of light incident on second mirror 122 from first mirror 121 has a component that is directed toward a vertically upward direction.

The reflection surface of second mirror 122 is larger than the reflection surface of first mirror 121 so as to magnify the image from the reflection surface of first mirror 121. Here, the reflection surface means an area of a mirror in which incident light is reflected. As the reflection surface becomes larger, the shape of the mirror becomes larger.

Second mirror 122 is disposed at a position closer to the front end of automobile 200 than first mirror 121. The reflection surface of second mirror 122 is eccentrically disposed so as to reflect the reflected light from first mirror 121 toward a reflection surface of windshield 220.

Here, horizontal line H1 is defined as a horizontal line at a lower end of second mirror 122, and horizontal line H2 is defined as a horizontal line at an upper end of second mirror 122. It is preferable that at least a part of the display surface of display device 101 is in a position lower than horizontal line H2. Also, it is preferable that a lower end of first mirror 121 is upper than horizontal line H1. In this manner, display device 101 and first mirror 121 are disposed between horizontal line H1 and horizontal line H2 so as to reduce the thickness of head-up display device 10.

Also, display device 101 and projection optical system 120 are disposed so that a ratio of distance D01 from a center of a surface of display device 101 to a center of a surface of first mirror 121 to distance D12 from the center of the surface of first mirror 121 to a center of a surface of second mirror 122, or ratio D01/D12, satisfies the following conditional formula:

$$0.4 < D01/D12 < 0.8$$

This conditional formula is set to avoid interference of display device 101 and a light ray, which would occur in a case where distance D01 becomes too short, and to avoid increase in the size of projection optical system 120, which would occur in a case where distance D01 becomes too long. Also, the conditional formula is set to avoid increase in the size of projection optical system 120, which would occur in a case where distance D12 becomes too long, and to avoid difficulty in correcting distortions of virtual image I due to increase in curvature of second mirror 122, which would occur in a case where distance D12 becomes too short.

Also, the above-described effects can be made more remarkable if the ratio of distance D01 from the center of the surface of display device 101 to the center of the surface of first mirror 121 to distance D12 from the center of the surface of first mirror 121 to the center of the surface of second mirror 122, or ratio D01/D12, satisfies the following conditional formula:

0.46<$D01/D12$<0.7

Next, with respect to head-up display 10 in accordance with the present exemplary embodiment, screen distortions of virtual image I viewed by observer D were evaluated by changing the kind of first mirror 121 and the kind of second mirror 122.

2. Examples 2-1. Example 1

In Example 1, a toroidal mirror having a concave surface shape was used as first mirror 121, and a free-form mirror having a concave surface shape was used as second mirror 122.

Table 1 shows a configuration of head-up display 10 in Example 1.

88.473 mm, distance ratio D01/D12 was 0.480, the size of the image displayed on display device 101 was 40.0 mm×17.8 mm, distance DDI from observer D to virtual image I as shown in FIG. 3 was 1800 mm, and the size of virtual image I was 180 mm×80 mm.

Here, each surface of the free-form mirror of the Examples is defined by Formula (1).

[Formula 1]

$$Z = \frac{cr^2}{1 + \sqrt{1 - (1+k)c^2r^2}} + \sum_{j=2} C_j x^m y^n \quad (1)$$

$$j = \frac{(m+n)^2 + m + 3n}{2} + 1$$

In Formula (1), z is a sag at a position (x, y) from an axis defining a surface, r is a radius of curvature at the origin of the axis defining the surface, c is a curvature at the origin of

TABLE 1

| Configuration | Surface No. | Mirror | Radius of Curvature X (mm) | Radius of Curvature Y (mm) | Eccentricity Data | | | | | |
|---|---|---|---|---|---|---|---|---|---|---|
| | | | | | X (mm) | Y (mm) | Z (mm) | ADE (deg.) | BDE (deg.) | CDE (deg.) |
| Display Device 101 | 1 | — | ∞ | ∞ | 0 | 0 | 0 | 0 | 0 | 0 |
| 1st Mirror 121 | 2 | Toroidal | ∞ | 500.000 | −5.977 | 8.172 | 39.651 | 63.274 | 0.043 | 3.804 |
| 2nd Mirror 122 | 3 | Free-Form | −250.442 | −250.442 | −3.311 | −63.287 | 88.230 | 147.800 | 3.862 | 1.052 |
| Windshield 220 | 4 | Toroidal | −3750.000 | −6000.000 | −33.682 | −56.340 | −136.564 | −117.812 | −6.860 | −9.051 |
| Observer D | 5 | — | ∞ | ∞ | −228.003 | 567.907 | −687.684 | −48.945 | −13.193 | 8.616 |

Referring to Table 1, the surface number indicates the order of the surfaces through which the light ray of the image displayed on display device 101 passes. Referring to Table 1, the light ray passes in the order of display device 101, first mirror 121, second mirror 122, windshield 220, and observer D.

Also, the eccentricity data in Table 1 indicate eccentric components of the respective surfaces from a reference. Specifically, X indicates an eccentric component in the X direction relative to the reference (unit: mm), Y indicates an eccentric component in the Y direction relative to the reference (unit: mm), and Z indicates an eccentric component in the Z direction relative to the reference (unit: mm). Also, ADE indicates an eccentric component of rotation about the X-axis relative to the reference (unit: degrees), BDE indicates an eccentric component of rotation about the Y-axis relative to the reference (unit: degrees), and CDE indicates an eccentric component of rotation about the Z-axis relative to the reference (unit: degrees).

Figure 4:
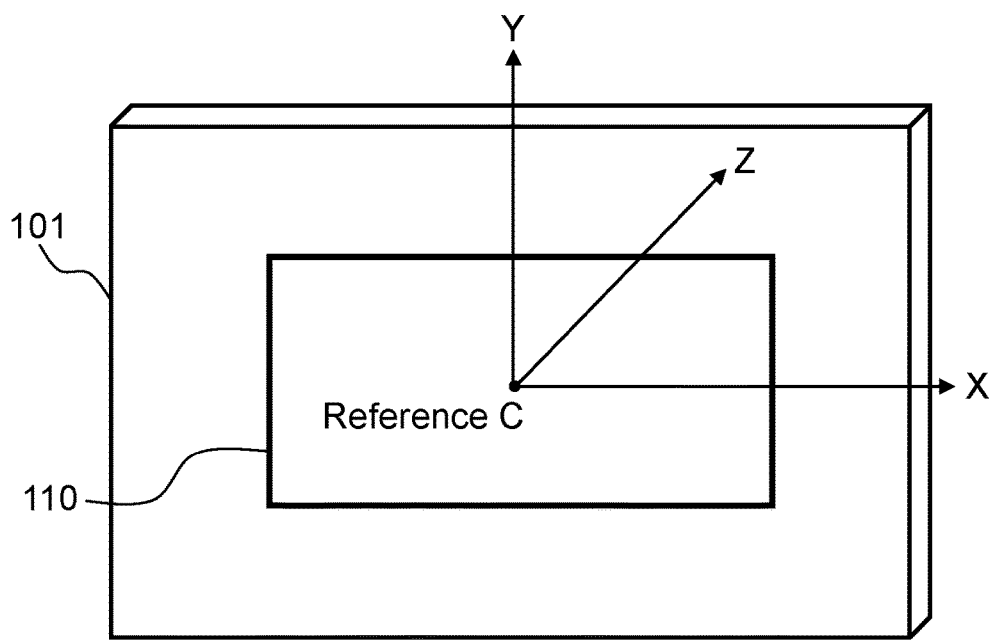
FIG. 4 is a diagram explaining a reference for Examples in accordance with the exemplary embodiment.

FIG. 4 is a diagram explaining a reference of the Examples. Referring to FIG. 4, reference C is a center of display part 110 on which display device 101 displays the image. Reference C is defined as the reference of the eccentricity data.

Further, in Table 1, radius of curvature X indicates a radius of curvature in the X-axis direction (unit: mm) at a position indicated by the eccentricity data on each of the surfaces configuring the head-up display, and radius of curvature Y indicates a radius of curvature in the Y-axis direction (unit: mm) at a position indicated by the eccentricity data on each of the surfaces configuring the head-up display.

Also, head-up display 10 in Example 1 was configured such that distance D01 was 42.486 mm, distance D12 was the axis defining the surface, k is a conic constant, Cj is a coefficient, m is a positive integer, and n is a positive integer.

Coefficients Cj of the free-form mirror used as second mirror 122 are defined in Table 2.

TABLE 2

| Polynomial Coefficients | |
|---|---|
| C4 | 3.50910E−03 |
| C5 | 1.65787E−05 |
| C6 | 3.36539E−03 |
| C7 | 4.29642E−07 |
| C8 | 5.25350E−07 |
| C9 | 2.10496E−07 |
| C10 | −4.21025E−06 |
| C11 | 1.59939E−08 |
| C12 | −1.23569E−09 |
| C13 | 9.55133E−09 |
| C14 | −4.61637E−09 |
| C15 | 3.13662E−08 |
| C16 | 1.11596E−12 |
| C17 | −1.95197E−10 |
| C18 | 5.90556E−11 |
| C19 | 1.60418E−10 |
| C20 | 6.09969E−11 |
| C21 | −9.53245E−11 |

Figure 5D:
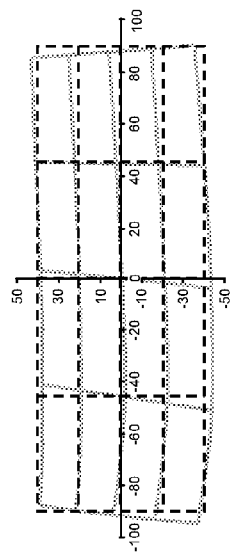
FIG. 5D is a diagram illustrating screen distortions of a virtual image viewed from an upper right position in the eyebox of the observer in Example 1.
Figure 5E:
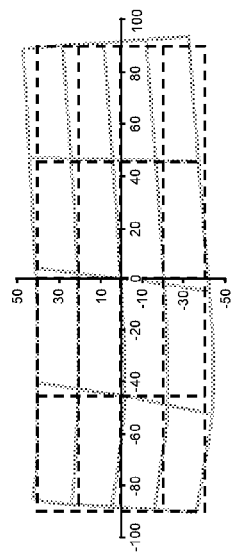
FIG. 5E is a diagram illustrating screen distortions of a virtual image viewed from a lower right position in the eyebox of the observer in Example 1.
Figure 5A:
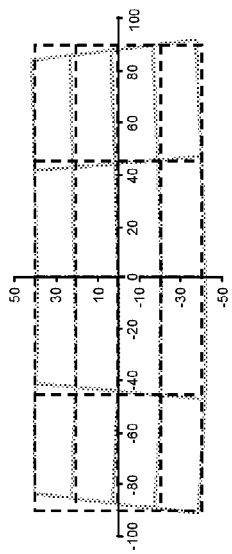
FIG. 5A is a diagram illustrating screen distortions of a virtual image viewed from a center position in an eyebox of an observer in Example 1.
Figure 5B:
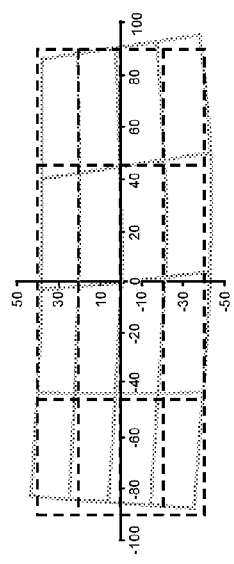
FIG. 5B is a diagram illustrating screen distortions of a virtual image viewed from an upper left position in the eyebox of the observer in Example 1.
Figure 5C:
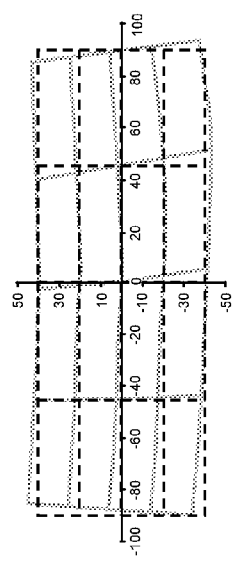
FIG. 5C is a diagram illustrating screen distortions of a virtual image viewed from a lower left position in the eyebox of the observer in Example 1.

With respect to head-up display 10 having the configuration in Example 1, screen distortions of virtual image I viewed from observer D were measured. FIG. 5A is a diagram illustrating screen distortions of virtual image I viewed from a center position in eyebox 300 of observer D in Example 1. FIG. 5B is a diagram illustrating screen distortions of virtual image I viewed from an upper left position in eyebox 300 of observer D in Example 1. FIG. 5C is a diagram illustrating screen distortions of virtual image I viewed from a lower left position in eyebox 300 of observer D in Example 1. FIG. 5D is a diagram illustrating screen distortions of virtual image I viewed from an upper right position in eyebox 300 of observer D in Example 1. FIG. 5E is a diagram illustrating screen distortions of virtual image I viewed from a lower right position in eyebox 300 of observer D in Example 1.

Eyebox 300 of the observer is assumed to be 130 mm wide by 40 mm tall. In each of FIG. 5A to FIG. 5E, an ideal shape of virtual image I is indicated by broken lines, and a shape of virtual image I projected from head-up display 10 of Example 1 is indicated by solid lines.

2-2. Example 2

In Example 2, a plane mirror having a planar surface shape was used as first mirror 121, and a toroidal mirror having a concave surface shape was used as second mirror 122.

Table 3 shows a configuration of head-up display 10 in Example 2.

TABLE 3

| Configuration | Surface No. | Mirror | Radius of Curvature X (mm) | Radius of Curvature Y (mm) | Eccentricity Data | | | | | |
|---|---|---|---|---|---|---|---|---|---|---|
| | | | | | X (mm) | Y (mm) | Z (mm) | ADE (deg.) | BDE (deg.) | CDE (deg.) |
| Display Device 101 | 1 | — | ∞ | ∞ | 0 | 0 | 0 | 0 | 0 | 0 |
| 1st Mirror 121 | 2 | Plane | ∞ | ∞ | 6.754 | 33.353 | 29.693 | −79.660 | −17.684 | −179.686 |
| 2nd Mirror 122 | 3 | Toroidal | 350.000 | 450.000 | 16.616 | 3.203 | 106.815 | −177.674 | −1.648 | −33.109 |
| Windshield 220 | 4 | Toroidal | −3750.000 | −6000.000 | 79.998 | −99.653 | −85.517 | −79.750 | −37.531 | 6.413 |
| Observer D | 5 | — | ∞ | ∞ | −68.436 | 39.342 | −916.074 | −9.782 | −10.255 | 42.966 |

Also, head-up display 10 in Example 2 was configured such that distance D01 was 43.553 mm, distance D12 was 82.515 mm, distance ratio D01/D12 was 0.528, the size of the image displayed on display device 101 was 40.5 mm×18.9 mm, distance DDI was 1800 mm, and the size of virtual image I was 150 mm×70 mm.

Figure 6D:
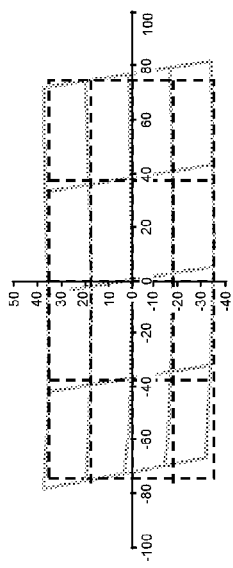
FIG. 6D is a diagram illustrating screen distortions of a virtual image viewed from an upper right position in the eyebox of the observer in Example 2.
Figure 6E:
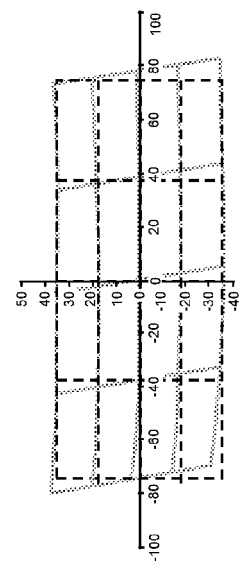
FIG. 6E is a diagram illustrating screen distortions of a virtual image viewed from a lower right position in the eyebox of the observer in Example 2.
Figure 6A:
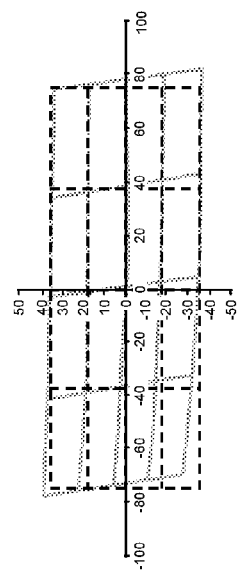
FIG. 6A is a diagram illustrating screen distortions of a virtual image viewed from a center position in an eyebox of an observer in Example 2.
Figure 6B:
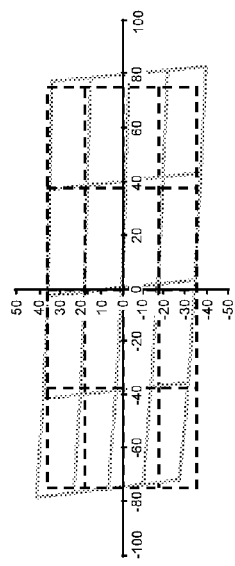
FIG. 6B is a diagram illustrating screen distortions of a virtual image viewed from an upper left position in the eyebox of the observer in Example 2.
Figure 6C:
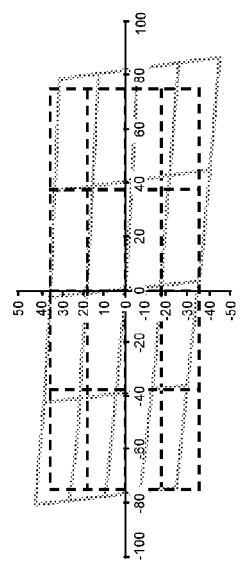
FIG. 6C is a diagram illustrating screen distortions of a virtual image viewed from a lower left position in the eyebox of the observer in Example 2.

With respect to head-up display 10 having the configuration in Example 2, screen distortions of virtual image I viewed from observer D were measured. FIG. 6A is a diagram illustrating screen distortions of virtual image I viewed from a center position in eyebox 300 of observer D in Example 2. FIG. 6B is a diagram illustrating screen distortions of virtual image I viewed from an upper left position in eyebox 300 of observer D in Example 2. FIG. 6C is a diagram illustrating screen distortions of virtual image I viewed from a lower left position in eyebox 300 of observer D in Example 2. FIG. 6D is a diagram illustrating screen distortions of virtual image I viewed from an upper right position in eyebox 300 of observer D in Example 2. FIG. 6E is a diagram illustrating screen distortions of virtual image I viewed from a lower right position in eyebox 300 of observer D in Example 2.

Eyebox 300 of the observer is assumed to be 130 mm wide by 40 mm tall. In each of FIG. 6A to FIG. 6E, an ideal shape of virtual image I is indicated by broken lines, and a shape of virtual image I projected from head-up display 10 of Example 2 is indicated by solid lines.

2-3. Example 3

In Example 3, a toroidal mirror having a concave surface shape was used as each of first mirror 121 and second mirror 122.

Table 4 shows a configuration of head-up display 10 in Example 3.

TABLE 4

| Configuration | Surface No. | Mirror | Radius of Curvature X (mm) | Radius of Curvature Y (mm) | Eccentricity Data | | | | | |
|---|---|---|---|---|---|---|---|---|---|---|
| | | | | | X (mm) | Y (mm) | Z (mm) | ADE (deg.) | BDE (deg.) | CDE (deg.) |
| Display Device 101 | 1 | — | ∞ | ∞ | 0 | 0 | 0 | 0 | 0 | 0 |
| 1st Mirror 121 | 2 | Toroidal | ∞ | 1135.126 | −4.934 | 22.438 | 37.562 | 85.399 | −2.349 | 5.226 |
| 2nd Mirror 122 | 3 | Toroidal | 350.000 | 450.000 | −1.402 | −31.378 | 103.273 | 169.958 | −0.777 | 3.294 |
| Windshield 220 | 4 | Toroidal | −3750.000 | −6000.000 | −4.099 | −101.553 | −110.469 | −94.726 | −1.639 | 1.558 |
| Observer D | 5 | — | ∞ | ∞ | −24.759 | 278.457 | −876.200 | −26.770 | −1.435 | 7.664 |

Also, head-up display 10 in Example 3 was configured such that distance D01 was 49.579 mm, distance D12 was 73.404 mm, distance ratio D01/D12 was 0.675, the size of the image displayed on display device 101 was 39.7 mm×14.7 mm, distance DDI from observer D to virtual image I was 1600 mm, and the size of virtual image I was 135 mm×50 mm.

Figure 7D:
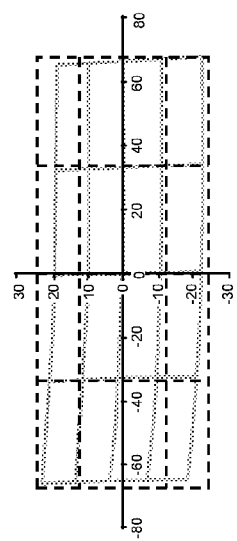
FIG. 7D is a diagram illustrating screen distortions of a virtual image viewed from an upper right position in the eyebox of the observer in Example 3.
Figure 7E:
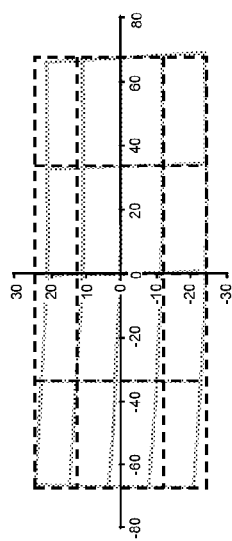
FIG. 7E is a diagram illustrating screen distortions of a virtual image viewed from a lower right position in the eyebox of the observer in Example 3.
Figure 7A:
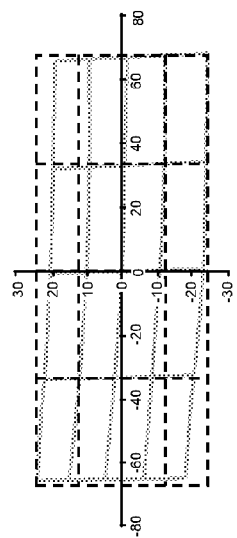
FIG. 7A is a diagram illustrating screen distortions of a virtual image viewed from a center position in an eyebox of an observer in Example 3.
Figure 7B:
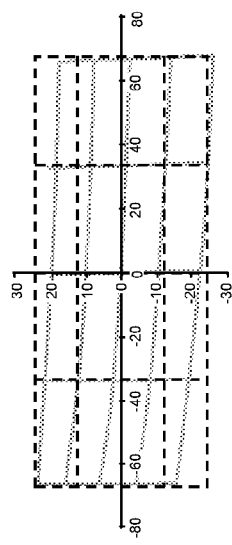
FIG. 7B is a diagram illustrating screen distortions of a virtual image viewed from an upper left position in the eyebox of the observer in Example 3.
Figure 7C:
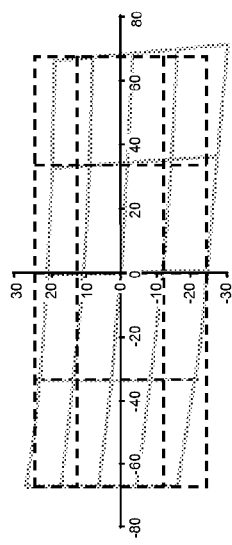
FIG. 7C is a diagram illustrating screen distortions of a virtual image viewed from a lower left position in the eyebox of the observer in Example 3.

With respect to head-up display 10 having the configuration in Example 3, screen distortions of virtual image I viewed from observer D were measured. FIG. 7A is a diagram illustrating screen distortions of virtual image I viewed from a center position in eyebox 300 of observer D in Example 3. FIG. 7B is a diagram illustrating screen distortions of virtual image I viewed from an upper left position in eyebox 300 of observer D in Example 3. FIG. 7C is a diagram illustrating screen distortions of virtual image I viewed from a lower left position in eyebox 300 of observer D in Example 3. FIG. 7D is a diagram illustrating screen distortions of virtual image I viewed from an upper right position in eyebox 300 of observer D in Example 3. FIG. 7E is a diagram illustrating screen distortions of virtual image I viewed from a lower right position in eyebox 300 of observer D in Example 3.

Eyebox 300 of the observer is assumed to be 130 mm wide by 40 mm tall. In each of FIG. 7A to FIG. 7E, an ideal shape of virtual image I is indicated by broken lines, and a shape of virtual image I projected from head-up display 10 of Example 3 is indicated by solid lines.

2-4. Example 4

In Example 4, a free-form mirror having a concave surface shape was used as each of first mirror 121 and second mirror 122.

Table 5 shows a configuration of head-up display 10 in Example 4.

TABLE 6-continued

| Polynomial Coefficients | |
|---|---|
| C17 | 3.30310E−10 |
| C18 | −6.34120E−10 |
| C19 | −1.27232E−09 |
| C20 | 5.32867E−10 |
| C21 | −1.67634E−09 |

Coefficients $C_j$ of the free-form mirror used as second mirror 122 are defined in Table 7.

TABLE 7

| Polynomial Coefficients | |
|---|---|
| C4 | 3.68097E−03 |
| C5 | 4.25298E−05 |
| C6 | 3.46203E−03 |
| C7 | 8.10276E−07 |
| C8 | −2.59192E−06 |
| C9 | 1.78069E−06 |
| C10 | −4.06032E−06 |
| C11 | 1.00283E−08 |
| C12 | −5.14133E−09 |
| C13 | 2.90029E−08 |
| C14 | −1.77642E−08 |
| C15 | 3.35355E−08 |
| C16 | −2.33979E−10 |
| C17 | 3.30310E−10 |
| C18 | −6.34120E−10 |
| C19 | −1.27232E−09 |
| C20 | 5.32867E−10 |
| C21 | −1.67634E−09 |

Also, head-up display 10 in Example 4 was configured such that distance D01 was 44.058 mm, distance D12 was 83.130 mm, distance ratio D01/D12 was 0.518, the size of the image displayed on display device 101 was 40.3 mm×16.1 mm, distance DDI was 2000 mm, and the size of virtual image I was 250 mm×100 mm.

TABLE 5

| Configuration | Surface No. | Mirror | Radius of Curvature X (mm) | Radius of Curvature Y (mm) | Eccentricity Data | | | | | |
|---|---|---|---|---|---|---|---|---|---|---|
| | | | | | X (mm) | Y (mm) | Z (mm) | ADE (deg.) | BDE (deg.) | CDE (deg.) |
| Display Device 101 | 1 | — | ∞ | ∞ | 0 | 0 | 0 | 0 | 0 | 0 |
| 1st Mirror 121 | 2 | Free-Form | 134.485 | 134.485 | −2.145 | 3.619 | 42.398 | 58.403 | −2.880 | 5.351 |
| 2nd Mirror 122 | 3 | Free-Form | −242.504 | −242.504 | −5.298 | −70.501 | 82.234 | 145.293 | 5.195 | 3.153 |
| Windshield 220 | 4 | Toroidal | −3750.000 | −6000.000 | −52.524 | −62.433 | −139.435 | −117.549 | −2.220 | −11.802 |
| Observer D | 5 | — | ∞ | ∞ | −259.497 | 567.143 | −679.742 | −49.754 | −14.029 | 3.138 |

Coefficients $C_j$ of the free-form mirror used as first mirror 121 are defined in Table 6.

TABLE 6

| Polynomial Coefficients | |
|---|---|
| C4 | −4.92756E−03 |
| C5 | −3.93664E−07 |
| C6 | −2.83233E−03 |
| C7 | 1.53412E−06 |
| C8 | −2.57103E−05 |
| C9 | 1.17719E−05 |
| C10 | 6.43726E−07 |
| C11 | −1.04555E−06 |
| C12 | −3.60843E−08 |
| C13 | −3.79098E−07 |
| C14 | 1.29595E−07 |
| C15 | −1.67292E−07 |
| C16 | −2.33979E−10 |

Figure 8D:
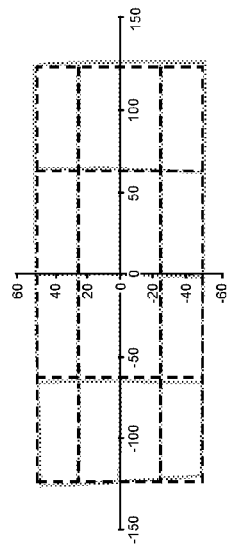
FIG. 8D is a diagram illustrating screen distortions of a virtual image viewed from an upper right position in the eyebox of the observer in Example 4.
Figure 8E:
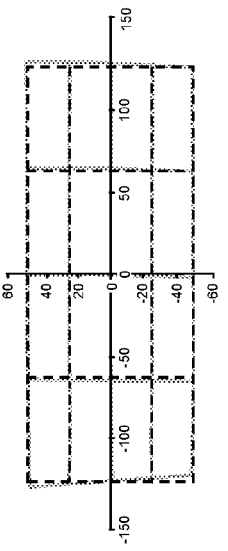
FIG. 8E is a diagram illustrating screen distortions of a virtual image viewed from a lower right position in the eyebox of the observer in Example 4.
Figure 8A:
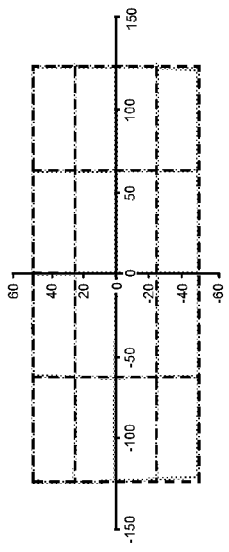
FIG. 8A is a diagram illustrating screen distortions of a virtual image viewed from a center position in an eyebox of an observer in Example 4.
Figure 8B:
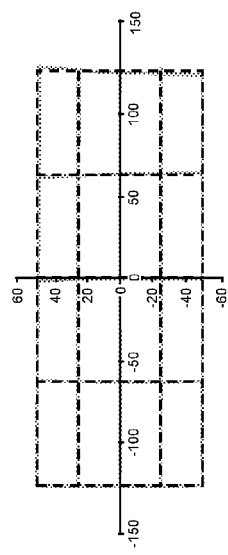
FIG. 8B is a diagram illustrating screen distortions of a virtual image viewed from an upper left position in the eyebox of the observer in Example 4.
Figure 8C:
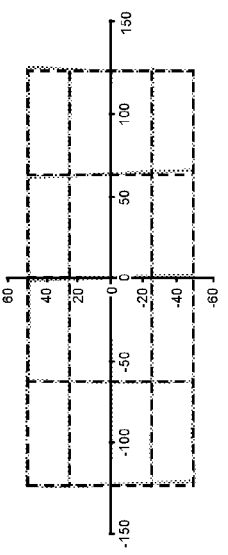
FIG. 8C is a diagram illustrating screen distortions of a virtual image viewed from a lower left position in the eyebox of the observer in Example 4.

With respect to head-up display 10 having the configuration in Example 4, screen distortions of virtual image I viewed from observer D were measured. FIG. 8A is a diagram illustrating screen distortions of virtual image I viewed from a center position in eyebox 300 of observer D in Example 4. FIG. 8B is a diagram illustrating screen distortions of virtual image I viewed from an upper left position in eyebox 300 of observer D in Example 4. FIG. 8C is a diagram illustrating screen distortions of virtual image I viewed from a lower left position in eyebox 300 of observer D in Example 4. FIG. 8D is a diagram illustrating screen distortions of virtual image I viewed from an upper right position in eyebox 300 of observer D in Example 4. FIG. 8E is a diagram illustrating screen distortions of virtual image I viewed from a lower right position in eyebox 300 of observer D in Example 4.

Eyebox 300 of the observer is assumed to be 130 mm wide by 40 mm tall. In each of FIG. 8A to FIG. 8E, an ideal shape of virtual image I is indicated by broken lines, and a shape of virtual image I projected from head-up display 10 of Example 4 is indicated by solid lines.

2-5. Example 5

In Example 5, a free-form mirror having a concave surface shape was used as each of first mirror 121 and second mirror 122.

Table 8 shows a configuration of head-up display 10 in Example 5.

TABLE 8

| Configuration | Surface No. | Mirror | Radius of Curvature X (mm) | Radius of Curvature Y (mm) | Eccentricity Data | | | | | |
|---|---|---|---|---|---|---|---|---|---|---|
| | | | | | X (mm) | Y (mm) | Z (mm) | ADE (deg.) | BDE (deg.) | CDE (deg.) |
| Display Device 101 | 1 | — | ∞ | ∞ | 0 | 0 | 0 | 0 | 0 | 0 |
| 1st Mirror 121 | 2 | Free-Form | 144.692 | 144.692 | −2.911 | 6.268 | 38.707 | 59.100 | −1.780 | 4.286 |
| 2nd Mirror 122 | 3 | Free-Form | −252.922 | −252.922 | −7.093 | −69.597 | 83.157 | 143.827 | 2.636 | −0.500 |
| Windshield 220 | 4 | Toroidal | −3750.000 | −6000.000 | −36.372 | −46.317 | −140.324 | −121.220 | −3.673 | −7.706 |
| Observer D | 5 | — | ∞ | ∞ | −195.690 | 621.227 | −650.363 | −53.002 | −10.779 | 6.085 |

Coefficients $C_j$ of the free-form mirror used as first mirror 121 are defined in Table 9.

TABLE 9

| Polynomial Coefficients | |
|---|---|
| C4 | −4.50409E−03 |
| C5 | 1.53404E−04 |
| C6 | −2.43336E−03 |
| C7 | 2.65121E−07 |
| C8 | −2.89849E−05 |
| C9 | 1.21260E−05 |
| C10 | −1.05387E−06 |
| C11 | −6.74428E−08 |
| C12 | −1.71989E−08 |
| C13 | −3.08855E−07 |
| C14 | 9.80098E−08 |
| C15 | −1.37500E−07 |
| C16 | −4.53920E−11 |
| C17 | 8.32094E−10 |
| C18 | −4.41048E−10 |
| C19 | −6.21622E−10 |
| C20 | 5.46934E−11 |
| C21 | −6.09987E−10 |

Coefficients $C_j$ of the free-form mirror used as second mirror 122 are defined in Table 10.

TABLE 10

| Polynomial Coefficients | |
|---|---|
| C4 | 3.57720E−03 |
| C5 | 2.78138E−05 |
| C6 | 3.41964E−03 |
| C7 | 6.53137E−07 |
| C8 | −3.12890E−06 |
| C9 | 1.57788E−06 |
| C10 | −4.35411E−06 |
| C11 | 1.08310E−08 |
| C12 | −2.80110E−09 |
| C13 | 3.57642E−08 |
| C14 | −1.38441E−08 |
| C15 | 3.12663E−08 |
| C16 | 3.31844E−12 |
| C17 | 3.76462E−11 |
| C18 | 2.68371E−11 |
| C19 | −4.19807E−11 |
| C20 | 6.02267E−11 |
| C21 | −8.43987E−11 |

Also, head-up display 10 in Example 5 was configured such that distance D01 was 42.326 mm, distance D12 was 88.303 mm, distance ratio D01/D12 was 0.479, the size of the image displayed on display device 101 was 58.3 mm×25.0 mm, distance DDI was 2000 mm, and the size of virtual image I was 350 mm×150 mm.

Figure 9D:
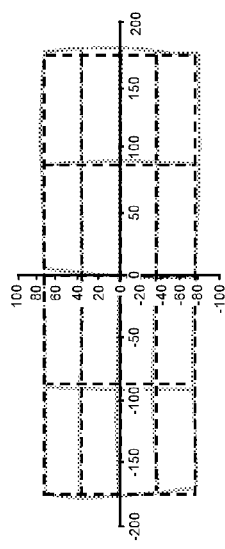
FIG. 9D is a diagram illustrating screen distortions of a virtual image viewed from an upper right position in the eyebox of the observer in Example 5.
Figure 9E:
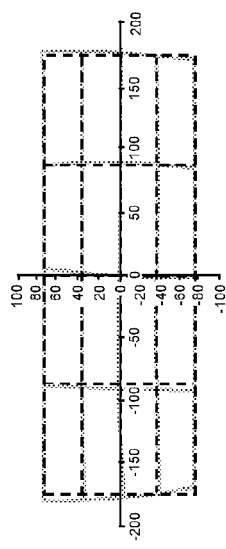
FIG. 9E is a diagram illustrating screen distortions of a virtual image viewed from a lower right position in the eyebox of the observer in Example 5.
Figure 9A:
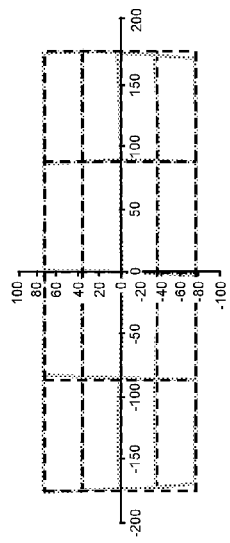
FIG. 9A is a diagram illustrating screen distortions of a virtual image viewed from a center position in a eyebox of an observer in Example 5.
Figure 9B:
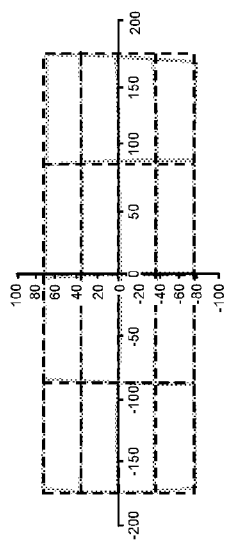
FIG. 9B is a diagram illustrating screen distortions of a virtual image viewed from an upper left position in the eyebox of the observer in Example 5.
Figure 9C:
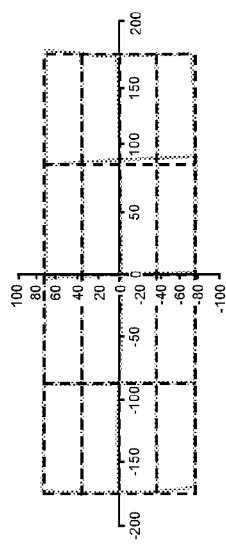
FIG. 9C is a diagram illustrating screen distortions of a virtual image viewed from a lower left position in the eyebox of the observer in Example 5.

With respect to head-up display 10 having the configuration in Example 5, screen distortions of virtual image I viewed from observer D were measured. FIG. 9A is a diagram illustrating screen distortions of virtual image I viewed from a center position in eyebox 300 of observer D in Example 5. FIG. 9B is a diagram illustrating screen distortions of virtual image I viewed from an upper left position in eyebox 300 of observer D in Example 5. FIG. 9C is a diagram illustrating screen distortions of virtual image I viewed from a lower left position in eyebox 300 of observer D in Example 5. FIG. 9D is a diagram illustrating screen distortions of virtual image I viewed from an upper right position in eyebox 300 of observer D in Example 5. FIG. 9E is a diagram illustrating screen distortions of virtual image I viewed from a lower right position in eyebox 300 of observer D in Example 5.

Eyebox 300 of the observer is assumed to be 130 mm wide by 40 mm tall. In each of FIG. 9A to FIG. 9E, an ideal shape of virtual image I is indicated by broken lines, and a shape of virtual image I projected from head-up display 10 of Example 5 is indicated by solid lines.

2-6. Example 6

In Example 6, a free-form mirror having a concave surface shape was used as each of first mirror 121 and second mirror 122.

Table 11 shows a configuration of head-up display 10 in Example 6.

TABLE 11

| Configuration | Surface No. | Mirror | Radius of Curvature X (mm) | Radius of Curvature Y (mm) | Eccentricity Data | | | | | |
|---|---|---|---|---|---|---|---|---|---|---|
| | | | | | X (mm) | Y (mm) | Z (mm) | ADE (deg.) | BDE (deg.) | CDE (deg.) |
| Display Device 101 | 1 | — | ∞ | ∞ | 0 | 0 | 0 | 0 | 0 | 0 |
| 1st Mirror 121 | 2 | Free-Form | 132.055 | 132.055 | −0.754 | 5.150 | 42.691 | 59.715 | −2.443 | 4.435 |
| 2nd Mirror 122 | 3 | Free-Form | −240.543 | −240.543 | −6.101 | −70.554 | 80.530 | 145.148 | 4.605 | 1.787 |
| Windshield 220 | 4 | Toroidal | −3750.000 | −6000.000 | −50.977 | −59.496 | −140.263 | −117.876 | −2.778 | −11.270 |
| Observer D | 5 | — | ∞ | ∞ | −253.799 | 572.494 | −679.325 | −49.927 | −13.747 | 3.877 |

Coefficients Cj of the free-form mirror used as first mirror 121 are defined in Table 12.

TABLE 12

| Polynomial Coefficients | |
|---|---|
| C4 | −4.95046E−03 |
| C5 | −4.70004E−05 |
| C6 | −2.83306E−03 |
| C7 | 3.26715E−06 |
| C8 | −2.63816E−05 |
| C9 | 1.19092E−05 |
| C10 | 2.28262E−06 |
| C11 | −1.38267E−07 |
| C12 | −3.68041E−08 |
| C13 | −4.25770E−07 |
| C14 | 4.63822E−08 |
| C15 | −9.91671E−08 |
| C16 | −9.04222E−10 |
| C17 | −5.98407E−11 |
| C18 | −7.07690E−10 |
| C19 | −1.78213E−09 |
| C20 | −1.14384E−09 |
| C21 | −1.17486E−09 |

Coefficients Cj of the free-form mirror used as second mirror 122 are defined in Table 13.

TABLE 13

| Polynomial Coefficients | |
|---|---|
| C4 | 3.66211E−03 |
| C5 | 6.22502E−05 |
| C6 | 3.45894E−03 |
| C7 | 9.75401E−07 |
| C8 | −2.52851E−06 |
| C9 | 1.84545E−06 |
| C10 | −3.72164E−06 |
| C11 | 9.27925E−09 |
| C12 | −4.92187E−09 |
| C13 | 3.02041E−08 |
| C14 | −2.26318E−08 |
| C15 | 2.71929E−08 |
| C16 | −8.68354E−12 |
| C17 | 2.98976E−11 |
| C18 | 5.59367E−11 |
| C19 | 1.34136E−11 |
| C20 | 1.25815E−10 |
| C21 | −1.83352E−10 |

Also, head-up display 10 in Example 6 was configured such that distance D01 was 46.417 mm, distance D12 was 79.844 mm, distance ratio D01/D12 was 0.581, the size of the image displayed on display device 101 was 25.0 mm×11.7 mm, distance DDI from observer D to virtual image I was 2000 mm, and the size of virtual image I was 150 mm×70 mm.

Figure 10D:
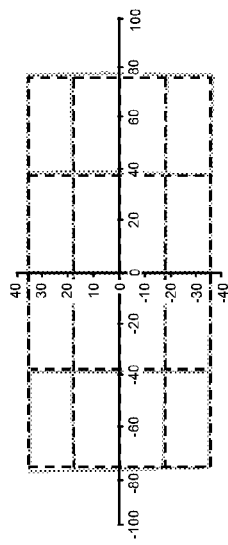
FIG. 10D is a diagram illustrating screen distortions of a virtual image viewed from an upper right position in the eyebox of the observer in Example 6.
Figure 10E:
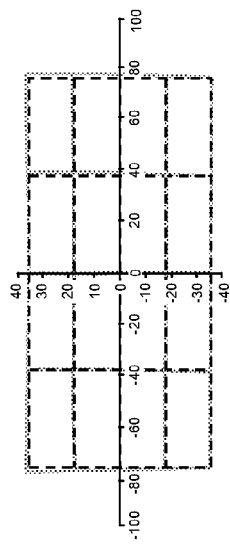
FIG. 10E is a diagram illustrating screen distortions of a virtual image viewed from a lower right position in the eyebox of the observer in Example 6.
Figure 10A:
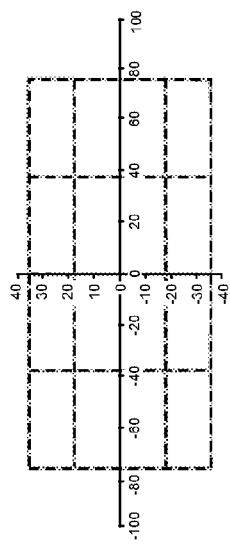
FIG. 10A is a diagram illustrating screen distortions of a virtual image viewed from a center position in a eyebox of an observer in Example 6.
Figure 10B:
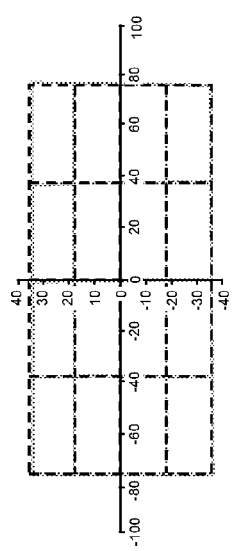
FIG. 10B is a diagram illustrating screen distortions of a virtual image viewed from an upper left position in the eyebox of the observer in Example 6.
Figure 10C:
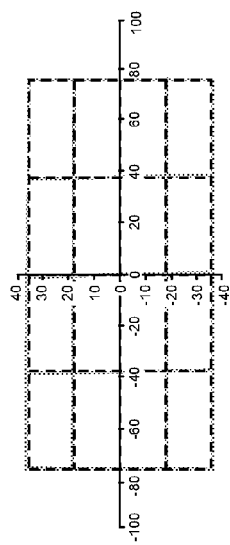
FIG. 10C is a diagram illustrating screen distortions of a virtual image viewed from a lower left position in the eyebox of the observer in Example 6.

With respect to head-up display 10 having the configuration in Example 6, screen distortions of virtual image I viewed from observer D were measured. FIG. 10A is a diagram illustrating screen distortions of virtual image I viewed from a center position in eyebox 300 of observer D in Example 6. FIG. 10B is a diagram illustrating screen distortions of virtual image I viewed from an upper left position in eyebox 300 of observer D in Example 6. FIG. 10C is a diagram illustrating screen distortions of virtual image I viewed from a lower left position in eyebox 300 of observer D in Example 6. FIG. 10D is a diagram illustrating screen distortions of virtual image I viewed from an upper right position in eyebox 300 of observer D in Example 6. FIG. 10E is a diagram illustrating screen distortions of virtual image I viewed from a lower right position in eyebox 300 of observer D in Example 6.

Eyebox 300 of the observer is assumed to be 130 mm wide by 40 mm tall. In each of FIG. 10A to FIG. 10E, an ideal shape of virtual image I is indicated by broken lines, and a shape of virtual image I projected from head-up display 10 of Example 6 is indicated by solid lines.

2-7. Distance Ratio

Ratios D01/D12 in Examples 1 to 6 are collectively shown in Table 14, where D01 is the distance from the center of the surface of display device 101 to the center of the surface of first mirror 121, and D12 is the distance from the center of the surface of first mirror 121 to the center of the surface of second mirror 122.

TABLE 14

| | Example 1 | Example 2 | Example 3 | Example 4 | Example 5 | Example 6 |
|---|---|---|---|---|---|---|
| D01 | 42.486 | 43.553 | 49.579 | 44.058 | 42.326 | 46.417 |
| D12 | 88.473 | 82.515 | 73.404 | 85.130 | 88.303 | 79.844 |
| D01/D12 | 0.480 | 0.528 | 0.675 | 0.518 | 0.479 | 0.581 |

2-8. Results

By comparing the screen distortions of virtual image I viewed from observer D in Examples 1 to 6, it is found that the screen distortions of virtual image I in Examples 4 to 6 are smaller than the screen distortions of virtual image I in Examples 1 to 3.

In other words, it is found preferable as a configuration of head-up display 10 to use a free-form mirror having a concave surface shape as first mirror 121 and to also use a free-form mirror having a concave surface shape as second mirror 122.

Also, if the screen distortions of virtual image I viewed from observer D in Example 1 is acceptable as a head-up display, not only the screen distortions of virtual image I can be reduced, but also production of first mirror 121 becomes easy, because first mirror 121 is a toroidal mirror having a concave surface shape.

Also, if the screen distortions of virtual image I viewed from observer D in Example 2 is acceptable as a head-up display, not only the screen distortions of virtual image I can be reduced, but also production of first mirror 121 and second mirror 122 becomes easier than that in Example 1, because first mirror 121 is a plane mirror having a planar surface shape and second mirror 122 is a toroidal mirror having a concave surface shape.

Also, if the screen distortions of virtual image I viewed from observer D in Example 3 is acceptable as a head-up display, not only the screen distortions of virtual image I can be reduced, but also production of first mirror 121 and second mirror 122 becomes easier than that in Example 1 because both of first mirror 121 and second mirror 122 are toroidal mirrors each having a concave surface shape.

3. Effects

As described hereinbefore, a head-up display in accordance with the present disclosure includes a display device that displays an image toward a vertically downward direction, a first mirror that reflects the image to output reflected light toward a vertically upward direction, and a second mirror that reflects the reflected light from the first mirror to output reflected light toward a vertically upward direction.

Also, the head-up display in accordance with the present disclosure is configured such that at least a part of the display device is disposed at a vertical position lower than an upper end of the second mirror.

Also, the head-up display in accordance with the present disclosure is configured such that the first mirror is disposed at a vertical position upper than a lower end of the second mirror.

A vehicle in accordance with the present disclosure includes a head-up display in accordance with the present disclosure, and a windshield that reflects reflected light emitted from the head-up display.

With the above-described configurations, it is possible to provide a thin head-up display, and a vehicle equipped with a thin head-up display.

Also, the head-up display in accordance with the present disclosure is configured such that a size of the second mirror is larger than a size of the first mirror.

This configuration makes it possible to magnify the image displayed on the display device.

Also, the head-up display in accordance with the present disclosure is configured such that each of a reflection surface of the first mirror and a reflection surface of the second mirror is a concave surface shape.

This configuration makes it possible to reduce a screen distortion of a virtual image produced from an image output from the head-up display in accordance with present disclosure.

Also, the head-up display in accordance with the present disclosure is configured such that a ratio of distance D01 from the center of the surface of the display device to the center of the surface of the first mirror to distance D12 from the center of the surface of the first mirror to the center of the surface of second mirror 122, or ratio D01/D12, satisfies the following conditional formula:

$$0.4 < D01/D12 < 0.8$$

This configuration makes it possible to avoid interference of the display device and a light ray, to reduce the size of the projection optical system, and to correct distortions of the virtual image, in the head-up display in accordance with the present disclosure.

The present disclosure is applicable to head-up displays that display an image ahead of a front glass of a vehicle such as an automobile.

What is claimed is:
1. A head-up display comprising:
a display device configured to display an image toward a direction including a downward direction;
a first mirror configured to reflect the image directly from the display device; and
a second mirror configured to reflect reflected light reflected from the first mirror,
wherein each of the reflected light from the first mirror and reflected light from the second mirror is to have a vector component directed toward an upward direction,
wherein the display device and the first mirror are on a same side of the head-up display in a horizontal direction, and
wherein an upper end of a display surface of the display device is lower than an upper end of the second mirror.
2. The head-up display according to claim 1, wherein a normal vector to the display surface of the display device has a vector component directed toward a downward direction.
3. The head-up display according to claim 1, wherein the first mirror is higher than a lower end of the second mirror in a vertical direction.
4. The head-up display according to claim 1, wherein a lower end of the first mirror is higher than a lower end of the second mirror.
5. The head-up display according to claim 1, wherein a size of the second mirror is larger than a size of the first mirror.
6. The head-up display according to claim 1, wherein a reflection surface of the second mirror is a concave surface.
7. The head-up display according to claim 1, wherein a reflection surface of the first mirror is a concave surface.
8. The head-up display according to claim 1, wherein a ratio of a distance D01 from a center of the display surface of the display device to a center of a surface of the first mirror to a distance D12 from the center of the surface of the first mirror to a center of a surface of the second mirror satisfies the following conditional formula:

$$0.4 < D01/D12 < 0.8.$$

9. A vehicle comprising:
the head-up display according to claim 1; and
a windshield configured to reflect reflected light output from the head-up display.
10. The head-up display according to claim 1, wherein the head-up display is configured such that a direction of light output of the display device does not overlap a direction of light reflection of the second mirror.
11. The head-up display according to claim 10, wherein the head-up display is configured such that the direction of light output of the display device is parallel to the direction of light reflection of the second mirror.
12. The head-up display according to claim 1, wherein there are no intervening mirrors between the first mirror and the second mirror.
13. A head-up display comprising:
a display device that displays an image toward a direction including a downward direction;
a first mirror that reflects the image directly from the display device; and
a second mirror that reflects reflected light reflected from the first mirror, wherein each of the reflected light from the first mirror and reflected light from the second mirror has a vector component directed toward an upward direction, wherein the display device and the first mirror are on a same side of the head-up display in a horizontal direction, and wherein an upper end of a display surface of the display device is lower than an upper end of the second mirror.

14. A vehicle comprising:
the head-up display according to claim 13; and
a windshield that reflects reflected light output from the head-up display.

15. The head-up display according to claim 13, wherein there are no intervening mirrors between the first mirror and the second mirror.

* * * * *